United States Patent

Osing et al.

[11] Patent Number: 5,607,505
[45] Date of Patent: Mar. 4, 1997

[54] WASTE TREATMENT PROCESS

[76] Inventors: Dirk Osing, Hohegrabenweg 109, 4005 Meerbusch 1; Günter Ritter, Gothestr. 29, 5040 Brühl; Günter Treutlein, Diepenbeekallee 2, 5000 Köln 40; Manfred Erken, Lothringer Ring 27, 5010 Bergheim, all of Germany

[21] Appl. No.: 586,168

[22] Filed: Jan. 16, 1996

Related U.S. Application Data

[62] Division of Ser. No. 370,522, Jan. 3, 1995, which is a continuation of Ser. No. 825,392, Jan. 24, 1992, abandoned.

[30] Foreign Application Priority Data

Jan. 24, 1991 [DE] Germany .......................... 41 02 032.4

[51] Int. Cl.$^6$ ..................................................... C04B 7/38
[52] U.S. Cl. ................................................................ 106/745
[58] Field of Search ............................................... 106/745

[56] References Cited

U.S. PATENT DOCUMENTS

| | | |
|---|---|---|
| 2,861,881 | 11/1958 | Phelps . |
| 4,148,627 | 4/1979 | Haley . |
| 4,226,630 | 10/1980 | Styron . |
| 4,456,400 | 6/1984 | Heide et al. . |
| 4,464,479 | 8/1984 | Ritter et al. . |
| 4,472,198 | 9/1984 | Nowicki et al. . |
| 4,585,475 | 4/1986 | Fosnacht . |
| 4,659,557 | 4/1987 | Lenz et al. . |
| 4,765,829 | 8/1988 | Beckmann et al. . |
| 4,940,487 | 7/1990 | Lugscheider et al. . |
| 5,288,413 | 2/1994 | Chu .......................................... 106/745 |
| 5,336,317 | 8/1994 | Beisswenger et al. ................. 106/745 |

FOREIGN PATENT DOCUMENTS

| | | |
|---|---|---|
| 31523 | 6/1973 | Australia . |
| 1013873 | 1/1958 | Germany . |
| 3926195 | 2/1991 | Germany . |
| 1252871 | 11/1971 | United Kingdom . |
| 1574719 | 2/1976 | United Kingdom . |

Primary Examiner—David Brunsman
Attorney, Agent, or Firm—Howson and Howson

[57] ABSTRACT

In a process for the treatment of at least one mixture of solid and liquid waste substances which contains at least one metal such as Fe and/or compounds thereof, for example oxides, the mixture occurring in a condition in which it can be used at least only with difficulty, the mixture is at least extensively homogenised and mixed with at least one very fine-grain dry substance containing fly ash and/or coke. The resulting mixture is of such a nature, for example being at least predominantly in the form of agglomerates, that it can be fed to a thermal procedure, possibly after a grading operation.

11 Claims, 1 Drawing Sheet

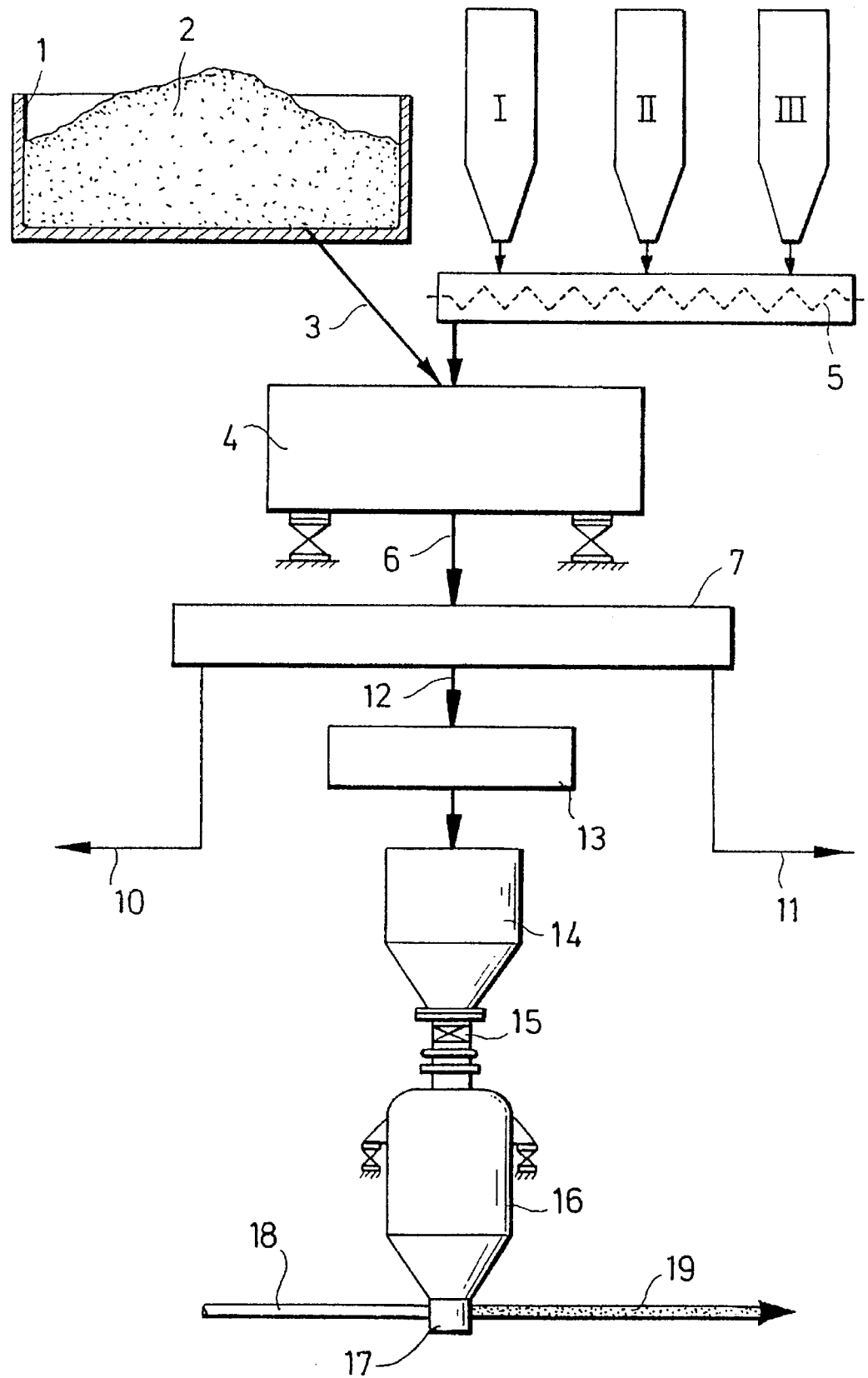

WASTE TREATMENT PROCESS

This is a division of our application Ser. No. 08/370,522, filed Jan. 3, 1995, which was a continuation of our application Ser. No. 07/825,392, filed Jan. 24, 1992 now abandoned.

BACKGROUND OF THE INVENTION

The invention concerns a process for the treatment of wastes, involving a first mixture of solid and liquid waste materials, which contains at least one metal such as Fe and/or compounds thereof, for example oxides, in such a condition that it cannot be used or can be used only with difficulty.

It is known for waste materials to be subjected to treatment, the aim of which is to put them into a condition in which they can be handled. Thus for example DE 32 08 699 C2 discloses a process for the production of granulated copperas —$FeSO_4 \cdot 7H_2O$. The latter is a waste product which is produced primarily in the manufacture of titanium dioxide. With pH-values of between 1 and 2, it is highly acid. It has a tendency to cake together so that it can only be removed from storage containers with considerable difficulty. The procedure involves mixing copperas with dried brown coal or lignite in dust form, in such an amount that the resulting mixture is capable of a trickle flow. Copperas is a relatively homogeneous waste material. That procedure is expensive as brown coal or lignite dust which may have only a low water content represents an expensive material.

DE 32 15 727 A1 discloses a process for the treatment of red mud which is a waste product that is produced in the production of aluminum in the form of iron oxide ($Fe_2O_3$, $Fe_3O_4$), being present in the form of an alkaline aqueous suspension. That suspension is filtered, with the red mud being deposited on the filter cloth. That procedure provides that the red mud is mixed with coal dust, more especially brown coal or lignite dust, in order to produce a mixture which is capable of trickle flow. That procedure is also expensive, especially as comparatively large amounts of coal dust must be used in order to produce the desired effect of a mixture which is capable of trickle flow. Red mud however is also a comparatively homogeneous waste product.

Many areas of industry involve the production of waste products which are substantially less homogeneous, as they frequently represent a mixture consisting of a plurality of solid and liquid components. A typical product of that kind is rolling scale slurry or sludge. Rolling scale is for example the oxidation layers which are produced when rolling and forging steel and when drawing wire. In the rolling mill, the rolling scale is swept off the rolled surface of the metal during the rolling operation, for example by means of a jet of water. The waste water which is charged with fine-grain rolling scale collects beneath the roll stand in the scale pit in which the roll scale slurry is deposited; the roll scale slurry, besides the metal oxide and water, also contains impurities due to carbon-bearing lubricants and all possible objects and articles which are thrown away in operation of the rolling mill. At any event, as regards the finer-grain consistuents of the rolling scale slurry or sludge, the latter is extremely difficult to handle so that in general it is not re-used, although its high content of iron oxide means that it would represent a valuable starting material. However, recycling for example to a metallurgical procedure would also involve taking account of the content of lubricant materials. Thus rolling scale slurry may contain for example more than 5% lubricating oil or the like so that it is not normally possible to treat the rolling scale slurry for example by sintering, as the combustion products which result from the oil components in the sintering operation give rise to problems.

Other waste materials which give rise to difficulties in regard to re-use thereof are sludges which originate from the production of iron oxide for the manufacture of ink or dye pigments, and black sludge which is produced in the manufacture of aluminium and which essentially comprises $Al_2O_3$, carbon predominantly in the form of graphite and between 35 and 40% water. The re-use of blast furnace flue gas dusts, blast furnace flue gas slurries or sludges, sinter dusts, converter dusts, converter sludges and foundry dusts which are produced in metallurgical works, as well as grinding dusts, grinding slurries and sludges, and dusts and sludges originating from cutting machining operations, also give rise to difficulties as they frequently occur in the form of a mixture which is difficult to handle or which also cannot be directly re-used.

Difficulties in terms of handling further arise by virtue of the fact that the above-indicated waste materials and waste mixtures occur in very different compositions and thus involve different consistencies. The mixtures are frequently also highly heterogeneous, for example due to the foreign objects which are contained in rolling scale sludge and which may also involve small pieces of waste from the rolled material; the fact that the mixtures are highly heterogeneous also makes it difficult to subject then to suitable treatment steps to produce a handleable product which can be re-used.

SUMMARY OF THE INVENTION

An object of the present invention is to provide a process for the treatment of waste, such that waste products which differ in terms of their composition and/or consistency and/or moisture content and/or impurities contained therein and which fluctuate in respect of composition and consistency can be put into a re-usable form by suitable treatment.

Another object of the present invention is to provide a waste treatment process such that the resulting product is put into a condition such as to permit it to be handled without difficulty.

Still another object of the present invention is to provide a waste treatment process which puts the waste material into a condition such that it can be re-utilised, with at least only a small amount of residue remaining after the process.

A still further object of the present invention is to provide a waste material treatment process which can be operated in an inexpensive fashion, not least also in regard to the substances or mixtures which are to be added to the waste material to be treated and which serve to vary the consistency thereof.

Yet a further object of the present invention is to provide a process for the treatment of a mixture of solid and liquid waste materials, involving the addition of substances thereto, which additional substances in turn also represent waste materials which in that way are recycled.

Still a further object of the present invention is to provide a process for the treatment of a mixture of solid and liquid waste materials, involving the addition thereto of treatment substances which as far as possible exhibit neutral characteristics in the context of the process or even have an advantageous effect on the procedures which take place in the treatment process.

In accordance with the present invention the foregoing and other objects are achieved by a process for the treatment of a first mixture of solid and liquid waste materials, which contains at least one metal, for example Fe, and/or at least one compound thereof, for example an oxide, the mixture occurring in a condition in which it cannot be used or can be used only with difficulty, wherein the mixture is at least extensively homogenised and wherein at least one very fine-grain dry substance which has fly ash and/or coke is added thereto and mixed therewith in such an amount that the resulting mixture occurs at least predominantly in the form of aggregates of which at least a part can be fed to a thermal procedure for re-utilisation thereof. The procedure can be such that the dry substance which has fly ash and/or coke is added to and mixed with the first mixture in such an amount that the resulting mixture is of a nature which permits grading or classification thereof, the grading or classification operation producing at least one fraction which can be fed to a thermal procedure for re-utilisation thereof.

The use of fly ash has a number of advantages. On the one hand, fly ash for a large part itself represents a waste product which can be re-utilised when carrying into effect the teaching in accordance with the invention. Fly ash which is generally deposited in electrical filters from gases such as more specifically flue gases is in dust form and is thus of extremely fine-grain nature so that, by virtue of its high specific surface area, it is capable of binding a very large amount of moisture. Furthermore in many cases fly ash includes constituents, for example and more especially CaO and MgO which advantageously influence the progress of the above-mentioned subsequent thermal procedure.

The use of coke can be considered more especially when it is also in dust form as coke dust is an inexpensive product which cannot be readily used for other purposes. However the use of fly ash will be preferred in many situations, especially as it occurs at a very large number of locations when cleaning for example flue gases and other gases, so that the expenditure involved in transporting it to the location at which the treatment is to be effected is in many cases less than when using coke.

The amount of flue ash and/or coke which is to be added to the respective first mixture and the duration of the mixing time essentially depend on the composition and the consistency of the first mixture. That mixing operation will additionally in general terms simultaneously involve homogenisation of the first mixture. It may however also be desirable or even necessary to effect homogenisation of the first mixture of waste materials prior to mixing with the substance or substances containing fly ash and/or coke. That may be the case for example when the first mixture of waste material has been stored for a prolonged period of time so that the individual components of the mixture have separated from each other or individual components have settled out.

In accordance with a preferred feature of the invention, the operating procedure may be such that added to the first mixture of waste material is a second mixture of liquid and/or solid waste material, the second mixture occurring in a different condition from the firs t mixture, at least in regard to moisture content and/or grain size. Handling in that way may be desirable for example when dealing with residues from the pigment industry for ink or dye production. Thus, iron oxide is used as a pigment, that is to say as a base material for the production of red or black inks or dyes. In that respect, similar residues occur in terms of composition, namely Fe-bearing oxidic residues from the settlement basin or vessel and Fe-bearing oxidic residues in the form of filter pastes and filter cakes. The residues from the settlement basin form a grainy, moist, black sludge or slurry, the grains of which predominantly comprise iron oxide. The filter residues form a moist sludge or slurry which however is smudgy and compact. Both residues can be mixed together in order in that way to give a resulting mixture which is then mixed with fly ash and/or coke.

It is also possible to operate in a corresponding fashion when treating rolling scale sludges which may occur in different consistencies for example in dependence on the works from which they originate. Here too it is possible to mix a first mixture of a rolling scale sludge with a second mixture of such a sludge, while fly ash and/or coke may be added To the first mixture and/or the second mixture and/or the mixture of the first and second mixtures.

The two examples referred to above rake use of mixtures which are at least substantially the same as each other in regard to their composition of material. It should be appreciated however that the invention can also be brought into effect if the first mixture and the second mixture are also clearly different from each other in terms of composition. Thus it is possible to use a rolling scale sludge as the first mixture and for example residues from the pigment industry as the second mixture, or vice-versa. It is also possible for the first mixture and/or the second mixture to represent mixtures made up of at least two starting mixtures:

The amount of fly ash and/or coke which is added to the first and/or the second mixture and/or the mixture resulting from the first and second mixtures depends on the respective parameters involved, for example and more especially the moisture content of the mixture and the composition and grain size of the additive substances. The amount involved can be ascertained by means of simple tests. It is to be so selected that, in the course of the mixing operation, agglomerates are formed which make it possible for the resulting mixture to be classified or graded for example by sieving in order in that way to remove foreign bodies which are present in the initial mixtures, for example paper, cleaning rags, bottles, pieces of wood, pieces of iron, metal cans, plastic foils and the like. The waste mixtures are not sievable in the original condition. Thus in the case of rolling scale sludge of a given consistency the required proportion of fly ash may be between 30 and 35% by weight of the moist rolling scale sludge. When dealing with the same rolling scale sludge, different amounts may be required in order to achieve the desired effect, when using coke or a fly ash of a different origin. In all situations the moisture content of the waste material mixture is so strongly bound by the fly ash and/or the coke that the above-mentioned aggregates are formed; the agglomerates do not cling together or they cling together only to such a slight extent that classification or grading thereof for example by sieving is possible. The addition of fly ash and/or coke avoids in particular the application of energy for drying the waste material mixture.

One or more further components in the waste material mixture include for example blast furnace gas dust, blast furnace gas sludge, sinter dust, converter dust, converter sludge, grinding dust, grinding sludge, foundry dust as well as dusts and sludges from cutting machining for example of metals. In that respect it is possible for the above-mentioned component or components also to contribute to binding the moisture in the initial mixture involved.

When using coke in a fine and/or very fine grain size for treatment of the first and/or second mixture, the C-content of the resulting mixture is thereby increased at the same time. That may have the advantage that in that way the carbon requirement of a subsequent process for re-utilisation of the material is entirely or partially met. Furthermore, irrespective of the treatment applied to the first and/or second mixture by the addition of fly ash and/or coke for the purposes of forming agglomerates and/or to make the material capable of being graded or classified, it is readily possible additionally to add coke and/or coal in a fine or very fine grain size, in order to adjust the C-content. It can be considered that that also results in certain amounts of moisture in the first and/or second mixture being bound, although that does not normally occur to the extent as when using fly ash or coke dust, which may have a surface area of around 300 m$^2$/g for example when it is made from brown coal or lignite.

If the fly ash does not contain an adequate amount of CaO and/or MgO or at least one substance which acts chemically in the same fashion, it may be desirable to add to the first mixture and/or the second mixture and/or the resulting mixture, burnt lime or a substance or substances which at elevated temperature gives burnt lime or at least one substance which chemically reacts in the same fashion. That will be desirable and possibly even necessary in particular if the acidity of the mixture which is fed for re-utilisation in a thermal process may not exceed a certain value or if that mixture must in any case be basic. The use of fly ash with such components is particularly appropriate at any event as it achieves the desired effect without additional expenditure due to the addition of burnt lime or the like. In particular brown coal or lignite ashes are frequently basic.

The use of such fly ashes may also be advantageous in particular for the reason that the resulting agglomerates, after a certain period of time, set and consolidate due to a binding procedure so that, in contrast to the starting material, they can be stored in the open air without any fear of the risk of environmental pollution for example under the effect of rainwater. It is also possible for the small agglomerates which are produced when carrying out the process according to the invention and which may be for example of a diameter of the order of magnitude of 4 mm to be pelletised to form larger agglomerates.

EXAMPLE

Further objects, features and advantages of the process in accordance with the present invention will be more clearly apparent from the following description of a preferred embodiment which involves the treatment of residues from the pigment industry. When such waste materials are stored in the open air, oxidation processes take place, with a corresponding amount of heat being produced, with the possibility of temperatures of more than 100° C. occurring. Therefore, with the normal requirements which are applied nowadays in regard to protection of the environment, it is no longer possible for materials of that kind to be dumped without special precautions being taken.

When using the process in accordance with the invention, to deal with such waste materials as referred to above, it is desirable for them firstly to be at least extensively homogenised. For that purpose the two waste materials which may differ from each other in particular in regard to moisture content and grain size, more specifically residues from a settlement basin and residues in the form of filter pastes and filter cakes, are mixed together in such a way as to produce a substantially unitary, black, moist, pulpy to compact material. Dry fly ash is then introduced into that material and mixed therewith. The amount of fly ash added depends on the desired nature of the resulting mixture made from the two initial mixtures of waste materials. That consideration also applies in regard to the duration of the mixing operation. Both parameters can be ascertained by simple testing, giving empirical values as, to which quantities of fly ash and/or coke are required in relation to a given consistency of the mixture. It can generally be assumed that the moisture content of fly ash and/or coke is negligibly small in this context.

In the course of the operation of admixing fly ash, the resulting mixture becomes friable or capable of trickle flow, with the formation of small agglomerates, so that it can be graded or classified for example by sieving for the purposes of removal of coarser impurities. When using basic brown coal or lignite fly ash, the acidity of the resulting predominantly agglomerated material is greatly reduced. If fly ash from pit coal firing operations is used, which is generally not basic, lime may be added to the mixture for neutralisation purposes. In that way the lime requirement which may possibly be involved in a subsequent thermal procedure can also be entirely or partially met by that addition.

The mixing ratio as between the first mixture which in this case comprises residues from a settlement basin and the second mixture which in this case comprises filter residues was about 3:1 in a specific case. With a delivery amount of 1000 kg, a mixing time of between 1 and 5 minutes and preferably between 1 and 2 minutes was generally sufficient to homogenise a first mixture and a second mixture in a forced-action mixer.

Thereupon additive substances were added to the mixture resulting from the first and second mixtures. Firstly, in relation to the amount of said resulting mixture, between 10 and 20% of brown coal or lignite fly ash was added, and mixed with the homogenised mixture in the above-mentioned mixer. That already resulted in a mixture which was in a friable condition or a condition of being capable of trickle flow and which is of a neutral to slightly basic character. At any event the mixture behaves neutrally in a subsequent metallurgical procedure. Its slight basicity is insignificant. For the preparation of C for the subsequent metallurgical process, it is possible to add brown coal and/or pit coal dusts or very fine-grain coke from such coals, for example in a ratio of between 7 and 8%, once again in relation to the charge amount of the first and second mixtures of waste materials. Whether and to what extent C-bearing dusts are added will depend on the respective circumstances involved, more especially the composition of the other substances which are fed to the thermal procedure.

Due to the addition of the very fine-grain fly ash with a hydraulic action, a large part of the moisture contained in the mixture is initially bound. Added to that there is the further effect that mixing with the fine ash particles which are predominantly for example of a grain size of between 70 and 90 μm means that access on the part of oxygen in the air to the Fe-oxide particles is made more difficult so that further exothermic reaction thereof is at least greatly restricted. That is not least a consequence of the above-mentioned formation of aggregates as that phenomenon reduces the effective surface area of the Fe-oxide particles. Furthermore the particles of ash form a kind of casing or sheathing around the agglomerates, and that also greatly reduces or prevents access of oxygen to the agglomerates. The same consideration also applies in regard to the addition of coke dust of correspondingly fine grain size. Thus, it is possible to produce a resulting mixture consisting of coke dust and the first and second mixture, which has similar properties to the resulting mixture which is obtained by the addition of fly ash. It will be noted that the addition of fly ash with pozzuolanic properties has the advantage that the agglomerates formed are bound and are thus made firmer.

In that case the resulting mixture can be pelletised. That is preferably effected after a grading or classification operation for the removal of impurities, foreign bodies and the like. Whether water must additionally be added for the pelletisation operation depends inter alia on the moisture content of the agglomerates formed in the preceding mixing phase. Generally there will be a certain need for an additional amount of water. The pellets obtained in that way can be hardened by the application of heat and/or by storage so that if necessary they have the level of strength required for the subsequent metallurgical procedure. In this connection also it may be advantageous for the fly ash to have pozzuolanic properties as the reactions which take place are exothermic and the heat produced reduces the moisture content of the pellets. Thus, in a specific case, the initial temperature of the pellets was between 100° and 120° C. After a storage time of 20 hours, the temperatures were only between 50° and 70° C. write after a storage time of 48 hours the temperatures found were only between 18° and 35° C. The pellets formed in that way are then subjected to a pressure testing operation in order to ascertain their strength. The results of that testing operation are set forth in Table I attached hereto. Those results show that, with the size of the pellets, the compression strength thereof also increases, as is demonstrated in particular by the results of tests A through M contained in Table I.

As the pellets were all non-round, in order to ascertain their size, two measurements were taken in first and second directions identified as 'd' and 'h', which were perpendicular to each other. The temperature at which the compression strength testing operations were carried out was 18° C.

Investigations were also carried out into the way in which the pellets produced behave in storage. A plurality of small beds or fills each containing 40 kg of those pellets were sprayed in a roofed-over space with different amounts of water in order to check whether and to what extent consolidation or crusting occurred. A small amount of crusting was found at the surface of the respective bed or fill but the thickness and hardness of the crusting was very slight. The crust could be easily rubbed off between the fingers. In particular the pellets remained over a period of several weeks. The same results were obtained when using a bed or fill of those pellets which were stored in the open air and exposed to rain. Those pellets were also still found to be capable of flow and suitable for pneumatic conveyance after having been stored in the open air for some weeks.

Treatment of the waste materials by mixing with basic brown coal or lignite ash also affords considerable advantages in regard to the storability of the resulting mixture or certain fractions thereof. That also applies in particular in regard to residues from the production of pigments, as they are frequently heavily charged with heavy metals and other undesirable components. If such residues are exposed to the action of rain, they result in the formation of seepage waters which are highly acid when it is untreated residues from pigment manufacture that are involved. They have a high level of demand for chemical oxygen.

After mixing with basic brown coal or lignite fly ash, the occurrence of acid seepage waters was no longer observed when the resulting agglomerates were stored. On the contrary the seepage waters produced were neutral to basic. When slightly alkaline seepage waters occurred, that can be attributed to the stored agglomerates. As a result of the elevated temperature of the agglomerates, which is to be attributed to the above-mentioned exothermic reactions which take place, a part of the recycled water is evaporated so that it can be disposed of, without involving additional energy expenditure.

Set out in accompanying Table II are the results of analysis of two elution tests which were carried out with two samples of residues from pigment manufacture. Those samples were not subjected to any particular treatment and in particular were not mixed with fly ash and/or coke dust.

Table II shows that the eluate is acid and contains considerable amounts of undesirable components, in particular heavy metals, with a high COD (Chemical Oxygen Demand).

Table III shows the results of elution tests on five samples of residues from pigment manufacture, which had been mixed with fly ash or coke in accordance with the process according to the invention. The following points are to be noted in relation to the individual samples:

The fly ash of sample 1 was an ash from a conventional brown coal dust firing operation.

The fly ashes of samples 3 through 5 involved fly ashes from a brown coal fluidised bed firing operation.

Sample 2 involved the use of dust from brown coal low-temperature coke.

A forced-action mixer was used for mixing all the samples.

A comparison in respect of the values of Tables II and III shows that a noticeable reduction in the COD-value was attained in every case, that is to say irrespective of whether coke or fly ash is added. In addition the change in the pH-value is a matter of significance as both the addition of fly ash and the addition of coke dust resulted in the eluate becoming basic. That leads to the conclusion that even the basic ash content of the coke of sample 2 is sufficient to produce a noticeable change in the pH-value although the extent of that change is clearly less than in the case of the samples which had been mixed with fly ash.

Another point of significance is the reduction in the content of heavy metals in the eluate by virtue of mixing of the waste with basic brown coal fly ash.

The rise in the sulfate content, apart from sample 2, in relation to the untreated samples of Table II, is evidently to be attributed to the sulfate content of the fly ash, in particular $CaSO_4$.

Pyrite sludges can be mixed in a similar fashion with fly ash and made friable or capable of trickle flow. Besides being mixed with ash, pyrite sludges are particularly suitable for mixing with brown coal or lignite coke, possibly also brown coal or lignite dust, in order to produce granular friable substance which can be stored without problems over prolonged periods of time, and transported and handled without difficulty in order in that form to be injected into a metallurgical procedure, for example a blast furnace procedure. As also in the case of other substances, for example rolling scale sludge, that can be effected in a simple fashion by way of the tuyeres of a blast furnace.

It is however also possible to briquette the resulting mixture which is produced by carrying out the process in accordance with the invention, although that should desirably be effected no later than two to three days after production of the resulting mixture. In that operation the residual moisture present therein is used to bind the briquettes. Fly ash, insofar as it has pozzuolanic properties, serves in that case as a binding agent.

BRIEF DESCRIPTION OF THE DRAWING

The single FIG. in the accompanying drawing is a diagrammatic view of a preferred apparatus for carrying out the process in accordance with the present invention.

DESCRIPTION OF THE PREFERRED EMBODIMENT

Rolling scale sludge which comes from a rolling mill is put into intermediate storage in a trough or other container 1. The rolling scale sludge 2 is moist and, besides oil and water, contains both metal and non-metal impurities. Frequent metal impurities are for example waste portions from the rolled material. Impurities of non-metal nature are predominantly formed by articles which are thrown away in operation of the rolling mill, for example cleaning rag, plastic cups, paper and the like. The sludge 2 frequently exhibits thixotropic properties which make it necessary for it to be put into intermediate storage in the trough 1.

The sludge 2 is taken from the trough 1 by way of a conveyor section as indicated at 3 and fed to a mixing device 4 which advantageously comprises a forced-action mixer. The sludge 2 is taken from the trough 1 in a batch-wise manner.

Depending on the size of the mixing device 4, for example 500 kg of rolling scale sludge may be taken from the trough 1 and introduced into the mixing device 4, every 5 through 10 minutes. The mixing device 4 is supplied by way of a metering screw 5 with additive substances which are stored in silos diagrammatically indicated at I, II and III. Thus for example silo I may contain fly ash from a brown coal or lignite firing operation. Silo II may be used to store coal or coke dust while silo III may be used to store other metal-bearing dusts, for example blast furnace dusts which contain metal compounds. The additive substances are also taken from silos I through III in a batch-wise manner independence on the amounts of sludge 2 which are fed to the mixing device 4.

Whether additive substances are fed to the mixing device 4 from all three silos I through III depends on the respective factors and parameters involved, in particular the composition and consistency of the sludge 2 and the subsequent use thereof. Thus it is possible for only fly ash to be added to the sludge 2, from the silo I. It is also possible to provide a silo for quick lime. That will be desirable in particular when using fly ash more especially from pit coal firing operations, which contains no or few basic components. The ratio of rolling scale sludge to The total amount of additive substances may be for example about between 2 and 5:1. The silos may be provided with suitable metering units (not shown).

The mixing time in the mixing device 4 is generally between 1 and 10 minutes, also depending on the nature of the sludge 2 and the amount of additive substance or substances added. After termination of the mixing operation, the resulting mixture which represents the conditioned rolling scale sludge as indicated at 6 is discharged from the mixing device 4 and passed on to a grading device 7 which can be for example in the form of a possibly multi-stage sieving or sifting device. The resulting mixture 6 which leaves the mixing device 4 normally occurs in the form of small agglomerates which are for example of a grain size of up to 4 mm. In the device 7 the impurities which generally comprise coarser pieces are separated off. In that respect the arrangement may be such that for example coarse metal and therefore magnetisable impurities are discharged at 10 while other, non-metal and thus non-magnetic impurities are discharged at 11.

The fine-grain material which passes through the sieve 7, as indicated at 12, which predominantly comprises agglomerates of a maximum grain size of for example about 4 mm, is put into intermediate storage, if required, as indicated at 13. That may be desirable for example in order firstly to wait for the agglomerates to bind and set. The material 12 is passed from the intermediate storage device 13, where provided, or possibly otherwise directly from the grading device 7, into a silo 14 which is connected by way of a valve 15 a pressure vessel or container 16. The vessel 16 has an outlet 17 which is communicated with a feed line 18 for a conveyor gas. Respective predetermined amounts of conditioned rolling scale sludge 6 are removed by means of the conveyor gas from the pressure vessel 16 through a discharge conduit 19 and injected for example into the tuyere of a blast furnace or into a rotary cylindrical kiln or furnace for the production of cement. There are many possible situations of use for re-utilisation of the conditioned, agglomerated rolling scale sludge 6.

When a sieve member is used in the grading device 7, it may be desirable for the sieve member to be provided, at least over parts of its extent, on the top side thereof, with a cover in the form of a flexible mat. The mat may be formed for example by a portion of a conveyor belt which entirely or predominantly consists of resilient material. Such a mat which is low in weight in relation to unit of surface area is intended to ensure that agglomerates which exceed a certain grain size are broken down to the grain size which is desired for passing through the sieve member.

In a departure from the operating procedure illustrated by means of the apparatus in the accompanying drawing, the procedure may also be such that the resulting mixture issuing from the grading device 7, possibly also after being put into intermediate storage at 13, is fed to a further mixer in which it is mixed with an additional granular substance with which jointly the resulting mixture is fed to a thermal procedure. Thus it is possible to envisage that, when coal dust is injected through the tuyeres into the structure of a blast furnace, the conditioned rolling scale sludge or some other mixture as indicated above may be fed to a mixer, a chamber or other space from which the conditioned mixture, jointly with the coal, is pneumatically conveyed and then injected into the blast furnace through its tuyeres. The way in which operation is more specifically effected in that respect depends on the prevailing circumstances, for example whether the carbonaceous material to be injected into the blast furnace or similarly employed in some other thermal procedure is suitable for conditioning of the mixture of waste materials or whether it serves only to meet the C-requirement.

TABLE I

Pressure tests on pellets until first cracking occurs in the pellet

| Sample No | d (mm) | h (mm) | Force (N) |
| --- | --- | --- | --- |
| 1 | 9.17 | 6.01 | 175 |
| 2 | 8.94 | 6.76 | 150 |
| 3 | 11.03 | 6.25 | 200 |
| 4 | 10.18 | 5.87 | 275 |
| 5 | 9.75 | 6.78 | 250 |
| 6 | 5.33 | 4.51 | 175 |
| 7 | 9.81 | 5.63 | 150 |
| 8 | 8.06 | 7.34 | 200 |

TABLE I-continued

Pressure tests on pellets until first cracking occurs in the pellet

| Sample No | d (mm) | h (mm) | Force (N) |
|---|---|---|---|
| 9  | 8.13  | 5.78  | 150 |
| 10 | 14.58 | 5.99  | 225 |
| 11 | 7.61  | 5.53  | 175 |
| 12 | 7.66  | 5.61  | 100 |
| 13 | 8.49  | 4.95  | 200 |
| 14 | 7.8   | 6.32  | 100 |
| 15 | 7.84  | 5.35  | 150 |
| 16 | 9.03  | 6.15  | 75  |
| 17 | 6.79  | 4.92  | 125 |
| A  | 27.0  | 12.64 | 600 |
| B  | 14.88 | 8.91  | 350 |
| C  | 22.64 | 15.88 | 200 |
| D  | 16.55 | 9.77  | 450 |
| E  | 17.26 | 12.34 | 450 |
| F  | 22.8  | 13.29 | 500 |
| G  | 17.15 | 9.2   | 250 |
| H  | 22.31 | 12.16 | 600 |
| I  | 13.87 | 10.45 | 300 |
| J  | 20.25 | 11.72 | 150 |
| K  | 19.87 | 8.93  | 475 |
| L  | 16.72 | 10.2  | 425 |
| M  | 11.22 | 7.9   | 350 |

TABLE II

Analysis of the eluate of unconditioned iron-oxide bearing residues from pigment production

|   | Sample 1 | Sample 2 |
|---|---|---|
| 1. ph-value | 4.6 | 4.7 |
| 2. Conductivity µS/cm | 1.605 | 1.670 |
| 3. COD mgO$_2$/l | 40 | 40 |
| 4. Sulfate content mg/l | 20 | 58 |
| 5. Chloride content mg/l | 2200 | 675 |
| 6. Copper content mg/l | 0.015 | 0.011 |
| 7. Nickel content mg/l | 12 | 8.1 |
| 8. Zinc content mg/l | 0.88 | 0.12 |

TABLE III

Analysis of the eluate of conditioned agglomerated iron oxide-bearing residues from pigment production

| Sample No | 1 | 2 | 3 | 4 | 5 |
|---|---|---|---|---|---|
| Amount of substance [g] | 54.00 | 58.00 | 56.65 | 51.86 | 53.45 |
| Moisture content | 7.45 | 13.76 | 11.75 | 3.59 | 6.45 |
| Dry substance [g] | 49.98 | 50.02 | 50.00 | 50.00 | |
| Amount of fly ash | 22.7 | | 16.6 | 8.8 | 16.6 |
| Amount of brown coal coke dust | | 9.0 | | | |
| Measurement values in the eluate after 24 hours | | | | | |
| pH-value | 11.2 | 6.7 | 9.3 | 9.6 | 8.9 |
| Conductivity µS/cm | 3.71 | 1.96 | 4.98 | 4.76 | 4.72 |
| COD mgO$_2$/l | 31 | <5 | <5 | 13 | 15 |
| Sulfate content mg/l | 354 | <10 | 798 | 769 | 814 |
| Chloride content mg/l | 1000 | 740 | 1320 | 1240 | 1140 |
| Copper content mg/l | <0.01 | 4.1 | <0.01 | <0.01 | <0.01 |
| Nickel content mg/l | <0.01 | 20.0 | <0.01 | <0.036 | <0.019 |
| Zinc content mg/l | <0.005 | 0.62 | <0.005 | <0.005 | <0.005 |

It will be appreciated that the above-described examples and embodiments have been set forth solely by way of illustration of the invention and various modifications may be made without departing from the scope and spirit of the invention.

What is claimed is:

1. A process for manufacturing a cement in a cement kiln, the process including injecting into the kiln a source of metal in the form of dry bonded agglomerates of up to about 4 mm grain size, the agglomerates comprising the product of force mixing a homogenized metal-containing mixture of liquid and solids with a dry fine grained additive selected from the group of fly ash, coke and blast furnace flue gas dust.

2. A process according the claim 1, wherein the product is allowed to stand after force mixing and before the injection.

3. A processing according to claim 1, wherein the furnace is a rotary cylindrical kiln or furnace.

4. A process according to claim 1, wherein the mixture is selected from one or more of the following group:

rolling scale sludge sludge residue from the pigment industry black sludge from the processing of aluminum sludge from the processing of pyrite sludge comprising blast furnace gas dust sludge from converters sludge from grinding operations sludge from foundry dust sludge containing cutting machinery dusts.

5. A process according to claim 1, wherein quicklime or a precursor thereof are added before the mixture is mixed with the additive.

6. A process according to claim 1, including the step of subjecting the formed agglomerates to a classification treatment to remove particles having a grain size above 4 mm.

7. A process according to claim 1, including the step of subjecting the formed agglomerates to pelletization.

8. A process according to claim 1, wherein a second waste material mixture containing metal and comprising solid material and liquid material is mixed with said homogenized metal-containing mixture before mixing with the additive.

9. A process according to claim 8, wherein the second mixture is mixed with said homogenized metal-containing mixture in a ratio of about 3:1 by weight.

10. A process according to claim 1, wherein the mixture and the additive are mixed in a weight ratio of 2 to 5:1.

11. A process according to claim 1, in which the homogenization of the metal-containing mixture of liquids and solids is effected prior to mixing with said additive.

* * * * *

UNITED STATES PATENT AND TRADEMARK OFFICE
CERTIFICATE OF CORRECTION

PATENT NO. : 5,607,505
DATED : 03/04/97
INVENTOR(S) : Osing et al.

It is certified that error appears in the above-indentified patent and that said Letters Patent is hereby corrected as shown below:

```
Column 2, line 29, change "then" to --them--;
Column 3, line 59, change "fiŕs t" to --first--;
Column 4, line 14, change "To" to --to--;
Column 4, line 16, change "rake" to --make--;
Column 4, line 49, change "aggregates" to --agglomerates--;
Column 7, line 21, change "write" to --while--;
Column 9, line 36-37, change "independence" to
    --in dependence--;
Column 9, line 48, change "The" to --the--.
```

Signed and Sealed this

Eighth Day of July, 1997

Attest:

BRUCE LEHMAN

Attesting Officer

Commissioner of Patents and Trademarks